July 18, 1939.  J. DEVEY, JR  2,166,626
COMBINE BEET HARVESTER
Filed Sept. 28, 1936  5 Sheets-Sheet 1

Inventor:
John Devey Jr.

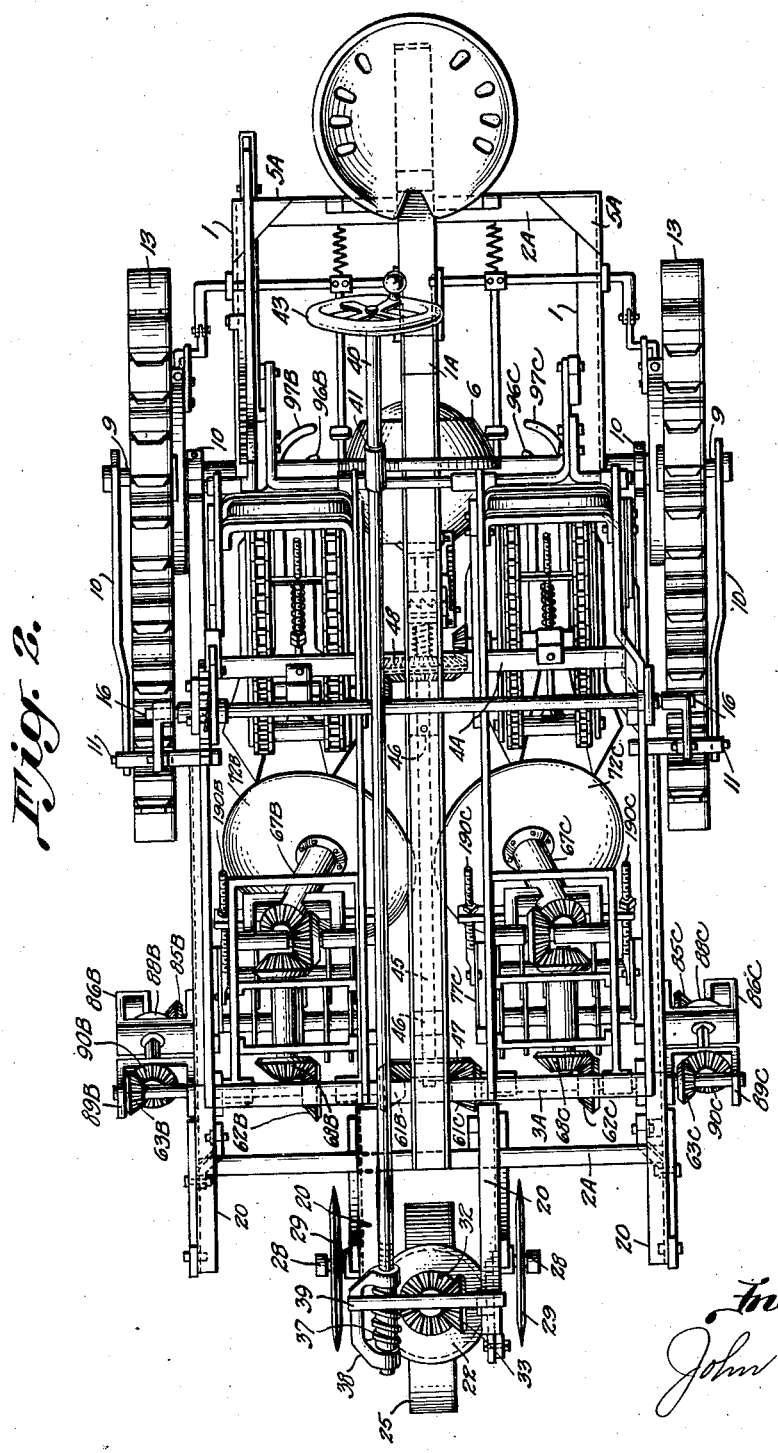

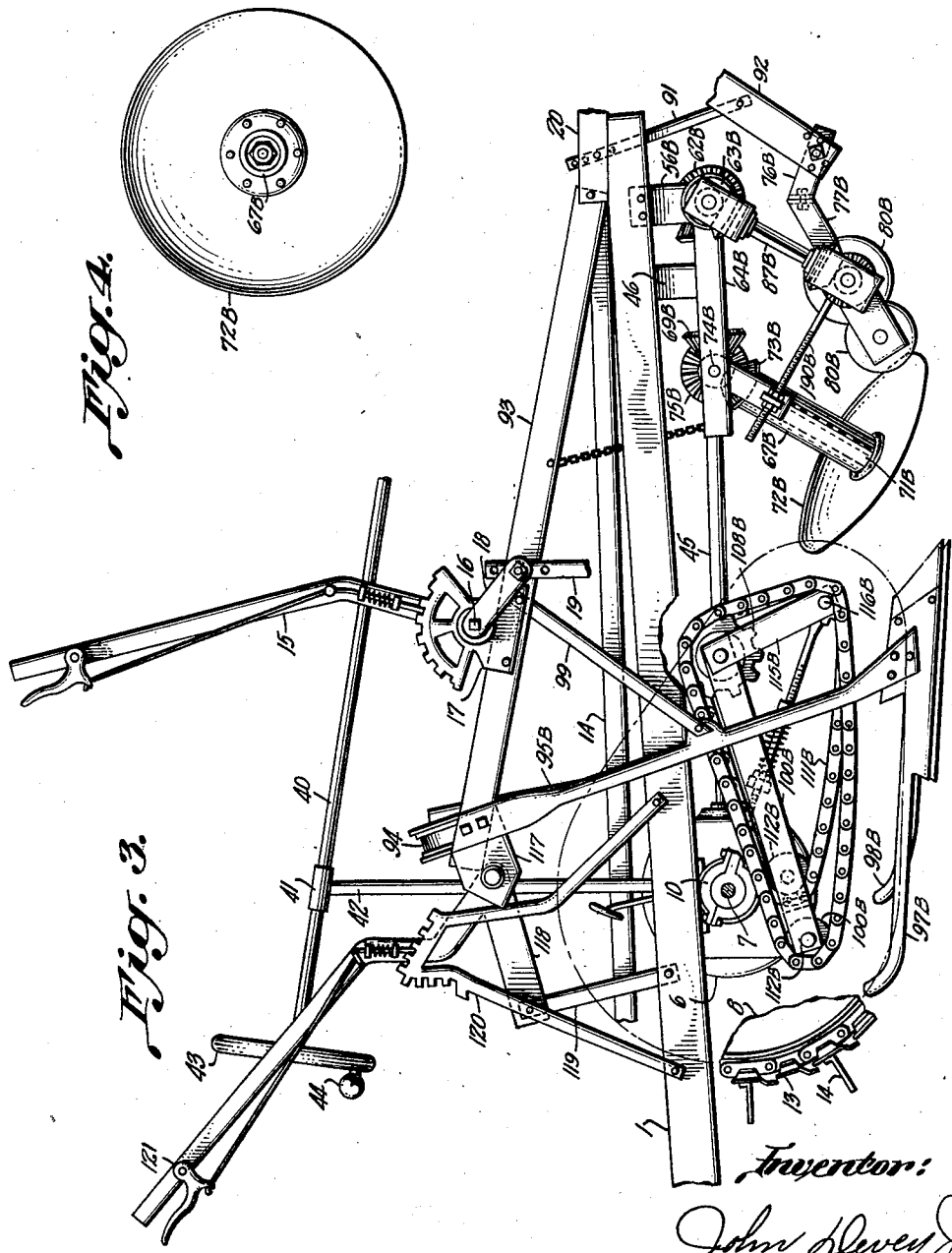

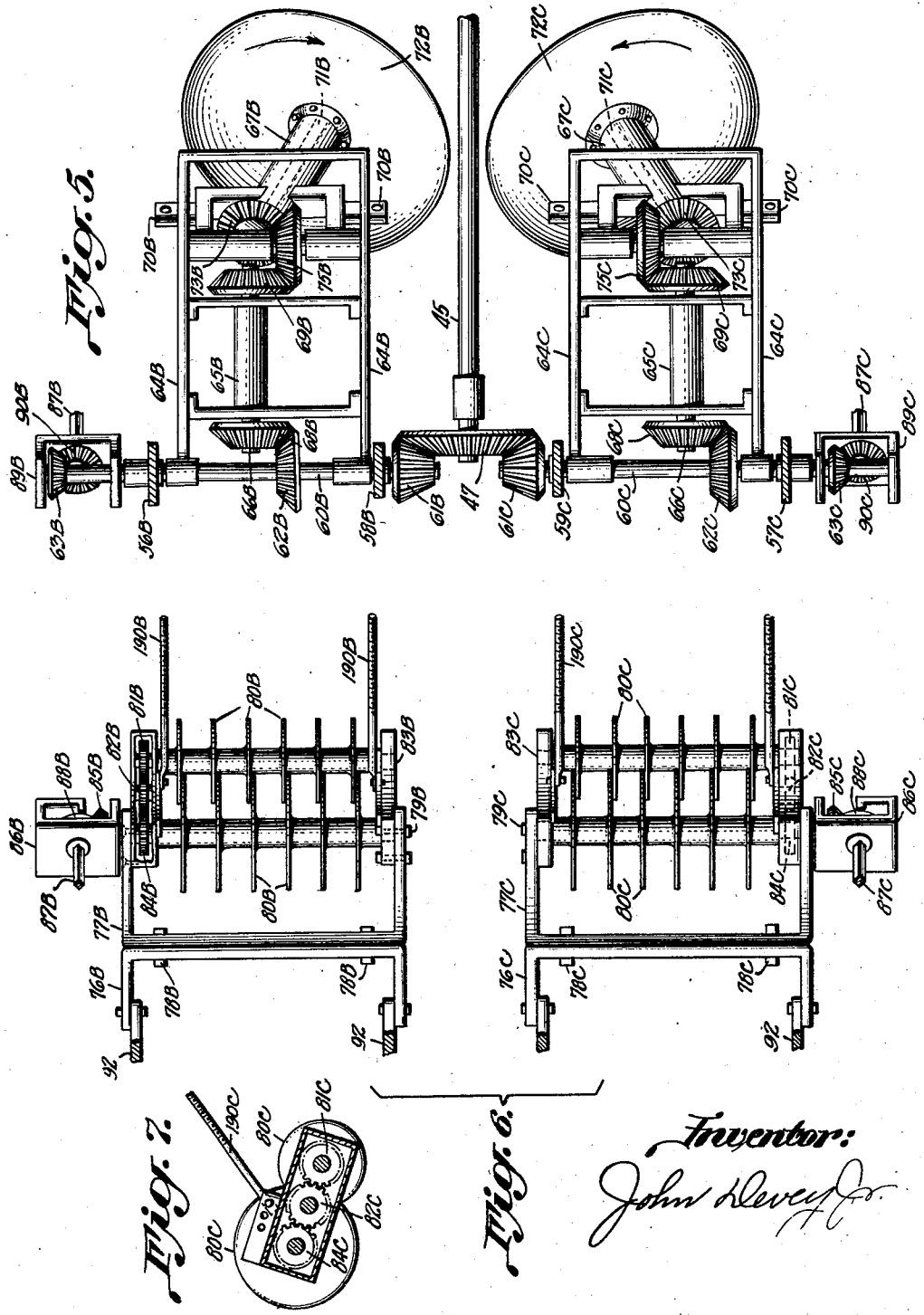

July 18, 1939. J. DEVEY, JR 2,166,626
COMBINE BEET HARVESTER
Filed Sept. 28, 1936 5 Sheets-Sheet 5
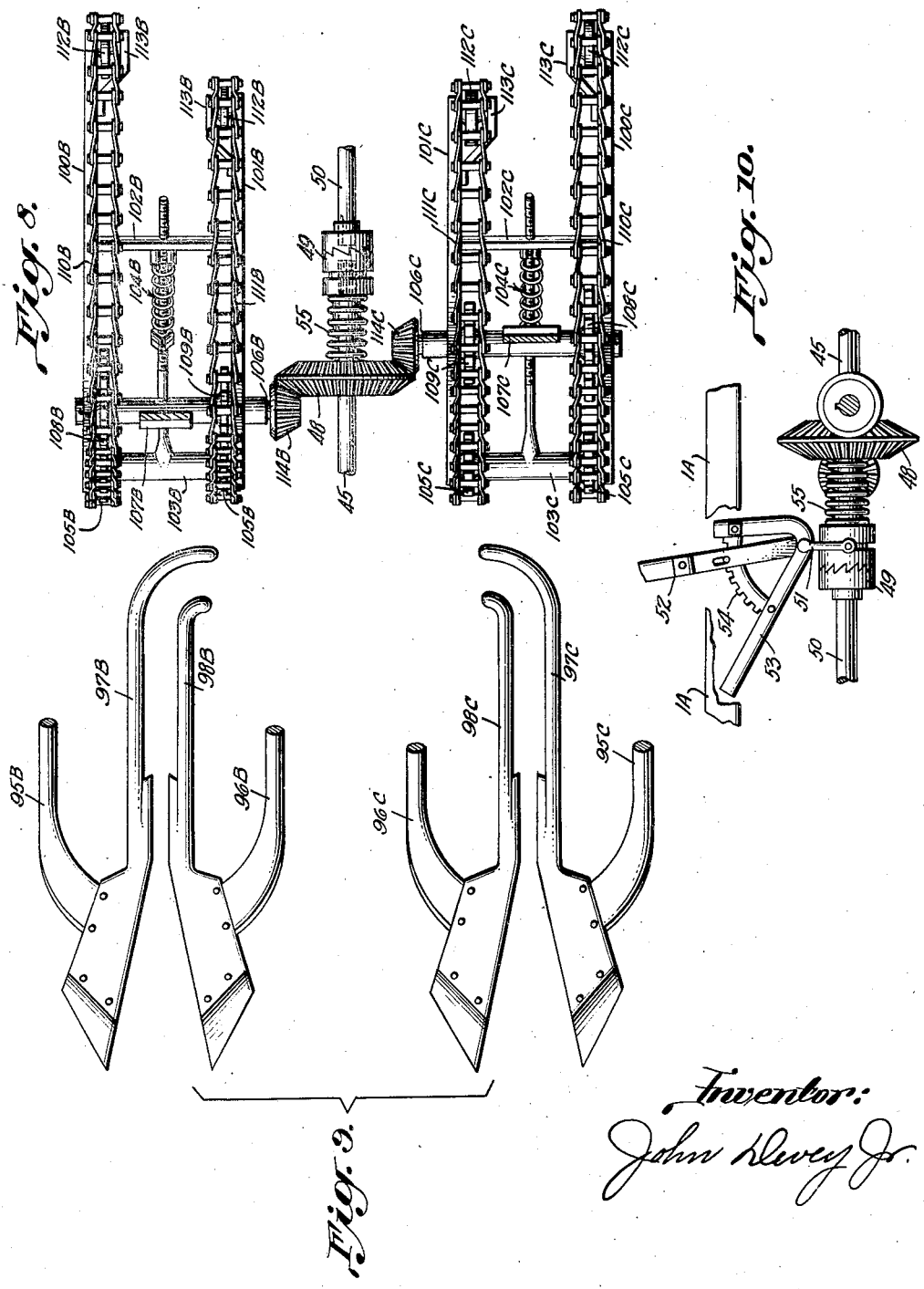
Inventor:
John Devey Jr.

Patented July 18, 1939

2,166,626

UNITED STATES PATENT OFFICE 2,166,626

COMBINE BEET HARVESTER

John Devey, Jr., Monterey Park, Calif., assignor of one-sixth to Harold W. Hunt and one-sixth to Walter West Hunt, both of El Centro, Calif.

Application September 28, 1936, Serial No. 103,047

19 Claims. (Cl. 55—9)

This invention relates to combine beet harvester machines, particularly to the combination of right side delivery of tops and left side delivery of beets, operating conjointly with left side delivery of tops and right side delivery of beets, these mechanisms operating in combination for the harvesting of beets or other root crops.

The adjustable foliage grip and traction tracks operating on drive wheels and wheels loosely journaled in oscillated end of supplemental frames insure positive traction; the feature of the oscillated end permits easy turning of the machine and the positive holding of foliage and severed beet tops when in operation.

The purpose of the present invention is to make more practical and to overcome numerous acknowledged defects in beet harvesting machinery; namely, too much pressure which pushes beets over chipping edges of beets as topping mechanism draws forward and downward in lowering over high beets; the clogging with beet tops, the unreliability as to amount cut from the beet caused by too many working connections, pressure springs, and unsatisfactory traction.

The object I have in view in perfecting my combine beet harvester is to build a combine beet harvester by constructing and placing in position the several combination parts, arrangements and devices so that the beet tops as well as the beets will be thrown in windrow by the simple operation of pulling or propelling the harvester over the beet field longitudinally to the beet rows. In order to eliminate the most objectionable features of beet harvesting machines the disks on my harvester for severing the tops are set at a side angle and retained in that same position by means of the housings set sidewise and pivoted to the retaining frames, thus the outer edges are placed considerably lower than the inner edges, making an opening through which the severed tops pass off the disks.

The shear blade mechanisms are self cleaning. The shear blades are circular and spaced so as to permit the foliage to be drawn through which is an essential feature in preventing the clogging of the severed tops. These circular shear blades are connected to the housings which carry the cutting edges so that as they are raised the cutting edges move in a vertical plane at a slower rate of speed than the circular shear blades.

By steering the furrow wheel the rolling colter blades are alined and the grip bands contact the grip band retaining members on the traction wheels causing a positive movement of the machine in the right direction. This feature is controlled by pressing foot pedals.

This invention consists of combination arrangement of different parts for a more simple way to harvest beets or other root crops and is hereinafter fully described and particularly pointed out in the appended claims.

The following references are made to the accompanying drawings:

Fig. 2 is the top plan view of the machine.

Fig. 3 is the elevation of the right side of the machine, showing the right outer side of the cutting disk at a lower elevation than the inner side, parts being broken away to permit better illustration of certain other parts.

Fig. 4 is a plan view of the cutting disk.

Fig. 5 is a top plan view of the right and left side delivery topping disks, showing the manner in which the housings which are placed sidewise are retained at an inner angle in the retaining frames; also the manner in which the driving mechanisms are assembled; it also shows the driving mechanism fastened in a pivot device for the circular shear blades.

Fig. 6 is a top plan view of the circular shear blades mounted in the angular shaped auxiliary frame; it also shows the driving mechanism on a pivot device which connects with the pivotal driving mechanism in Fig. 5, also the straight gear driving mechanism for rotating both lines of circular shear blades in the same rotational direction.

Fig. 7 is a side view of the circular shear blades and driving mechanism partly in section.

Fig. 8 is a top plan view of the oscillated cleaner chains and driving mechanism.

Fig. 9 is a plan view of the circuitous shaped digger blades mounted on digger arms.

Fig. 10 is a side view of the clutch and operating lever.

Figure 1:
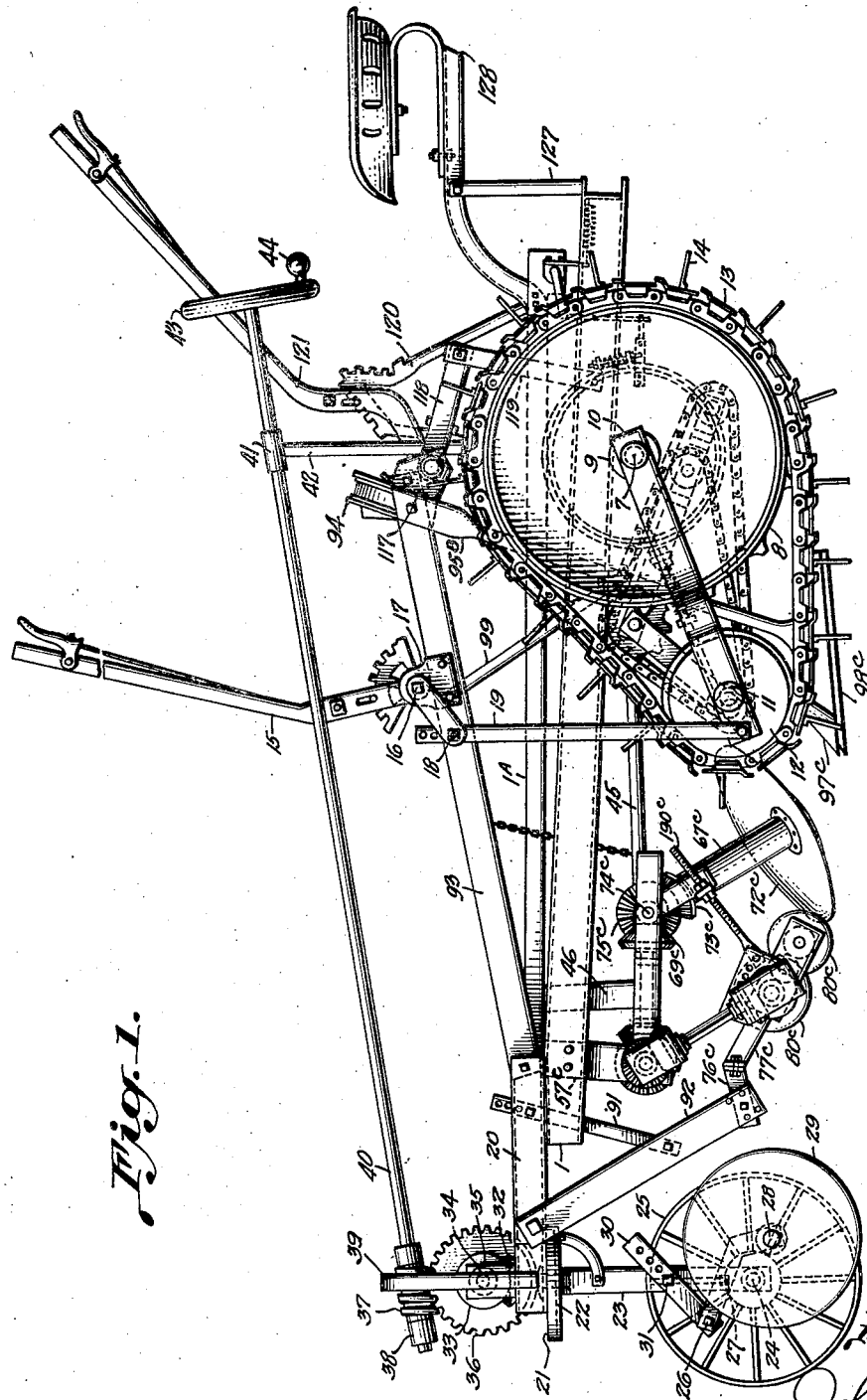
Figure 1 is the elevation of the left side of the machine and shows the left outer side of the cutting disk at a lower elevation than the inner side.

The combine beet harvesting machine described in this invention is constructed and adapted so that with one operation it will sever simultaneously the tops of beets in two or more rows and lift the beets from the soil and transfer them into a windrow which operation constitutes the harvesting of beets.

In numbering the different parts of the machine on the drawings, all numbers with the accompanying letter A, signify parts pertaining to the main frame; all numbers with the accompanying letter C, signify parts pertaining to left side delivery of tops and the right side delivery of beets; all numbers with the letter B, signify parts pertaining to right side delivery of tops and the left side delivery of beets.

Referring to the accompanying drawings, the main frame of the machine comprises longitudinally extending side members 1, center line member 1A, end members 2A, and cross members 3A and 4A. The main frame is reinforced at the rear end with corner plates 5A. A transmission housing 6 is secured to side members 1 of main frame near rear end, axles 7 are journaled in said housing and secured in transmission not shown. Drive wheels 8, with tread teeth on face or rim and having grip band retaining members, are secured to the axles.

The supplemental frames which support the free end of the link-belt foliage grip tracks, are composed of outer and inner side members 10. The outer side members are pivoted to hub 9 of wheels 8 and the inner side members are pivoted to the housing near the inner side of wheels 8, and extending forward. A shaft 11 is secured transversely in the free ends of each pair of side members 10 of supplemental frames. Wheel 12 is loosely journaled on each shaft. Endless link-belt tracks 13, whereon are secured lug plates 14, are mounted on wheels 8 and 12 and are for the purpose of securing foliage grip and ground traction. The free ends of the supplemental frames are oscillated in a vertical plane, by the operating of lever 15, which is secured to shaft 16. This shaft is journaled in bearing 17, which is fastened to side members of the supplemental digger frames 93. Shaft 16, has fastened on each end a downward extending arm 18, to which links 19 are connected on pivots with several holes in the upper ends. The other ends of these links are pivoted to the front end of the members 10 of the supplemental frames. By operating lever 15, the free ends of the supplemental frames and tracks are raised or lowered.

Forward extending supports 20, are fastened to the front end of the main frame; there are four such supports. A circular plate 21 is fastened to the two center supports, and has journaled within and against it a circular plate 22, to which is secured a downward extending U-shaped frame 23. This frame has attached to it a shaft 24 whereon is loosely journaled the wheel 25. An adjustable arm 26 is fastened on each side of the downward extending frame 23 by means of a bolt 27. Each arm has fastened in the lower end a stub shaft 28, on each stub shaft is loosely journaled a rolling colter blade 29 for severing foliage. Adjustable link 30 is fastened in the upper end of the downward extending arms 26, and is fastened in one of the several holes in the opposite end of link 30 to the U shaped frame with a bolt 31. Plate 22 has fastened to the upper end a bevel gear 32, which meshes with bevel gear 33 secured on shaft 34, said shaft is journaled transversely of supports 20 in bearings 35, a worm gear wheel 36 is secured on shaft 34, and meshes with worm 37 which is pivoted to shaft 34 by means of a pivotal retaining member 38. Arch member 39 is secured to supports 20, arch 39 supports bearings 35 wherein is journaled shaft 34, rod 40 is secured in worm 37 and journaled in bearing 41, which is fastened to the braced upright 42. Hand wheel 43, having knob 44, is fastened on rod 40 and is placed in a convenient position for the operator and by turning this steering device the furrow wheel and roller colter blades are steered along the row.

The main shaft 45 is journaled longitudinally of the main frame in bearings 46 and bearings 46 are fastened to center line member 1A of main frame. Two gears 47 and 48 are fastened on the main shaft 45. Gear 47 is fastened on the front end and is the drive gear for the cutting disk and circular shear blades. Gear 48 is fastened near the rear end, and has teeth on both sides, and is the gear that drives the endless cleaner chains. One half of clutch 49 has a groove recess into which fits the half circle part 51, which part 51 is fastened to lever 52, which is fastened to bracket 53. The notched segment 54 is secured to bracket 53. When the clutch 49 is set at the desired position a tension tooth is forced into one of the several notches in the segment and tension spring 55 serves in keeping the jaws of clutch firmly together. The other half of clutch 49 is fastened to stub shaft 50, which is journaled in housing 6 and is driven from the transmission and when the clutch 49 is pressed together all driven parts of the harvester will operate at the same time. Bracket 53 is fastened to center line member 1A of main frame.

Bearings 56B and 57C are fastened to side members 1 of main frame. Bearings 58B and 59C are fastened to cross member 3A of main frame. Shaft 60B, with gears 61B, and 62B, and 63B secured thereon, is journaled in bearings 56B, and 58B. A retaining frame 64B is pivotally mounted at front end of said bearings and extends rearward. Bearing housing 65B is fastened longitudinally in retaining frame 64B. A shaft 66B, having gear 68B secured on forward end and gear 69B secured on rear end, is journaled in housing 65B. Housing 67B, in a sidewise position has side members 70B on each side and is pivoted near rear end of the retaining frame and extends downward and a vertical shaft 71B is journaled in the housing in a sidewise position. To the lower end of said shaft is fastened a cutting disk 72B with the outer edge at a lower elevation than the inner edge. On the upper end of said shaft is fastened a bevel gear 73B. A shaft 74B is journaled in the housing set sidewise at the pivotal point and is only shown on Fig. 3. This shaft has fastened on it a bevel gear 75B, which meshes with gear 69B, also with gear 73B. Bevel gear 68B meshes with bevel gear 62B and bevel gear 61B meshes with bevel gear 47.

The adjustable downward extending arms 92 are fastened to main frame at the forward end, to which are pivoted the adjustable angular shaped frames, said arms are made adjustable by means of links 91.

The adjustable angular shaped auxiliary frame is composed of section 76B, and 77B. Section 77B of said frames is connected with section 76B at their angular shaped adjustment point by bolts 78B. The upper shaft 79B is journaled transversely of the auxiliary frame in section 77B. This shaft has fixed and spaced thereon multiple circular shear blades 80B.

Gear 84B is fastened on shaft 79B and meshes with gear 82B. The lower shaft 83B has spaced and fixed thereon multiple circular shear blades 80B, and gear 81B is fastened on the end of this shaft. The shear blades on these shafts are spaced and set so that the one set of blades will clean the other. These blades are so spaced and set so as to permit foliage to be drawn through, and are the first parts of the machine to come in contact with the crown of the beets.

Gear 81B on shaft 83B meshes with loosely journaled gear 82B. Retaining member 86B is pivoted to shaft 79B and has journaled in it a bevel gear 88B, which gear meshes with bevel gear 85B. Bevel gear 88B has a long receiving hub wherein shaft 87B is permitted to slip backward and forward as the shear blades are raised and lowered when they contact and adjust to the uneven beets. The upper end of shaft 87B is journaled in a pivotal retaining member 89B which is pivoted to shaft 60B. On the upper end of shaft 87B is secured bevel gear 90B which meshes with bevel gear 63B.

The adjustable links 190B are threaded a considerable distance on the upper end, the other end being pivoted at the rear of the center of the auxiliary frames. The threaded end extends through the opening of the side member 70B which is secured to the housing which is placed in and is held at any desired position by a lock nut on each side of the member 70B. When the shear blades contact and adjust to the crown of the uneven beets the housing which is set sidewise is forced to travel in the same vertical plane as the auxiliary frame but at a slower rate of speed. The outer edge of the cutting disk 72B is placed at a lower elevation than the inner and is driven to rotate in the opposite directional movement of disk 72C, which causes the severed beet tops to be delivered to the right side.

There are four side parts 93 of the supplemental digger frames which are pivoted to the forward end of the main frame and extending rearward. Each pair of digger arms are secured together at their rear end with a downward turned U shaped brace 94. A brace 99 is fastened to each side member and connects with the digger arms. Digger arms 95B and 95C are fastened to the outer side of the supplemental digger frames. Digger arms 96B and 96C are fastened to the inner side of the supplemental digger frames. Digger arm 95B has fixed to the lower end a circuitous shaped digger blade 97B and digger arm 96B has secured to the lower end a circuitous shaped digger blade 98B which is shorter and set at a lower elevation than the digger blade 97B.

The auxiliary frame whereon are mounted the endless cleaner chains, is composed of side members 100B and 101B, fastened together with cross brace 102B. The front ends of these parts are fastened together with the shaft 116B whereon is loosely pivoted the adjustable rod 103B. On this rod is fixed a tension spring 104B.

Loosely journaled sprockets 105B are on shaft 116B. The side members of the auxiliary frame are pivotally mounted on shaft 106B which is journaled crosswise of the main frame near rear end in bearing 107B. A large sprocket 108B is fastened on the outer end of shaft 106B and a smaller sprocket is fastened to the same shaft and in alinement with the loosely journaled sprocket 105B.

Endless cleaner chains 110B, 111B and roller 112B are loosely journaled in the rear end of the side members and in alinement with the loosely journaled sprockets, over which the endless cleaner chains operate; the outer chain being of greater length than the inner and traveling at a greater rate of speed. Chain guide 113B is secured to the side members and keeps the chain in alinement with the roller. Gear 114B is fastened on end of shaft 106B and meshes with gear 48 on main drive shaft. Downward extending arms 115B are pivoted at their upper end on shaft 106B and in the lower end there is fastened shaft 116B on which sprockets 105B are loosely journaled.

Bracket plate 117, having a large receiving hole, is fastened on the rear end of each side member 93 of the supplemental digger frames into which is journaled a pivoted retained lifting frame 118. The lower ends of links 119 are pivoted to side members 1 of the main frame. A notched part 120 is also fastened to the side member of the main frame. A lever 121 is fastened to the lifting frame and contacts part 120. The pivoted journaled lifting frame being connected to the main frame, enables the operator by means of a lever to raise or lower all working parts in one operation, which parts can be set by releasing the part which is controlled by the hand grip lever so that it will engage with the racket teeth.

In further describing the machine it is necessary to describe only the parts that are operated to accomplish the left side delivery of tops and right side delivery of beets, the numbers designating these parts are the same as the numbers of the parts that are used to accomplish the right side delivery of tops and the left side delivery of beets, except that the letter C is used as previously indicated.

A retaining frame 64C is mounted on a pivot at the front end of bearings 57C and 59C which are fastened to cross member 3A and side member 1 of main frame and extending rearward. Bearing housing 65C is fastened longitudinally in retaining frame 64C. A shaft 66C, having gear 68C fastened on forward end, and gear 69C on rear end, is journaled in housing 65C. Housing 67C set sidewise having side parts 70C on each side is hung on a pivot near the rear end of the retaining frame and extending downward. A vertical shaft 71C is journaled in the housing set in a sidewise position and at the lower end of this shaft there is secured a cutting disk 72C with the outer edge at a lower elevation than the inner edge. On the upper end of this shaft is fastened the bevel gear 73C. The shaft 74C is journaled in the housing, set in a sidewise position at the pivotal point and is only shown on Fig. 1. This shaft has fastened on it a bevel gear 75C, which meshes with gear 69C and also with gear 73C. Bevel gear 68C meshes with bevel gear 62C and bevel gear 61C meshes with bevel gear 47.

The adjustable angular shaped auxiliary frame is composed of section 76C, and 77C, section 77C of said frames are connected with section 76C at their angular shaped adjustment point by bolts 78C. The upper shaft 79C is journaled transversely to the auxiliary frame in section 77C and said shaft has fastened thereon spaced multiple circular shear blades 80C. Gear 84C is fastened on shaft 79C, and meshes with gear 82C. The lower shaft 83C has spaced multiple circular shear blades 80C fastened thereon and gear 81C fastened on the end of this shaft. The shear blades on these shafts are so spaced and set that the blades on the one shaft contact the side of the blades on the other, thus the one set of blades cleans the other. These blades are spaced and set in such position so that the foliage can be drawn through, and are the first part of the machine to come in contact with the crown of beets.

Gear 81C on shaft 83C meshes with loosely journaled gear 82C. Retaining member 86C is pivoted to shaft 79C and has journaled in it a bevel gear 88C, this gear meshes with bevel gear 85C. Bevel gear 88C has a long receiving hub wherein shaft 87C is permitted to slip backward and forward as the shear blades are raised and lowered as they contact the uneven beets. The lower end of shaft 87C is journaled in pivotal retaining member 89C which is pivoted to shaft 60C and on the upper end of shaft 87C is fastened bevel gear 90C which meshes with bevel gear 63C.

Digger arm 95C has fastened to the lower end a circuitous shaped digger blade 97C. Digger arm 96C has fastened to the lower end a circuitous shaped digger blade 98C which is shorter and set at a lower elevation than the digger blade 97C, which delivers the beets to the right side, right along the side of beets from left side delivery.

The auxiliary frame whereon are mounted the endless cleaner chains, is composed of side parts 100C and 101C fastened together by cross brace 102C. The front ends of the side parts are fastened together with a shaft 116C, whereon is loosely pivoted adjustable rod 103C and on this rod is a tension spring 104C. Loosely journaled sprockets 105C are on shaft 116C. The side members of the auxiliary frame are pivotally mounted on shaft 106C which is journaled crosswise of the main frame near rear end in bearing 107C. A large sprocket 108C is fastened on the outer end of shaft 106C, and a smaller sprocket is fastened to the same shaft and in alinement with loosely journaled sprocket 105C. Endless cleaner chains 110C, 111C and roller 112C are loosely journaled in the rear end of side members and in alinement with the loosely journaled sprockets, over which the endless cleaner chains operate, the outer chain being of greater length than the inner chain, it traveling at a greater rate of speed. Chain guide 113C is secured to the side members and keeps the chain in alinement with roller. Gear 114C is secured on end of shaft 106C and meshes with gear 48 on main drive shaft. Downward extending arms 115C are pivoted at their upper end on shaft 106C, in the lower end is secured shaft 116C on which are loosely journaled sprockets 105C.

It is impractical to harvest beets with the one delivery system.

I claim:

1. In a machine of the character specified, the combination with the main frame wheels supported pivotally, the connected supplemental frames having mounted endless track for foliage grip and traction, auxiliary frames having long and short sides and pivotally journaled on main frame; a roller journaled in the long and short sides of auxiliary frame; mounted endless link belts, the outer belts traveling at a greater rate of speed than the inner belts, the free ends of auxiliary frames oscillating in a vertical plane, the chains of each contacting the beets in combination with circuitous digger blades; means for operating these same blades; shafts with bevel gears secured thereon journaled in bearings transversely in the forward end of main frame; retaining frames mounted on said bearings retaining sidewise positioned housings; cutting disks secured in shafts journaled in sidewise positioned housings, angular shaped auxiliary frames pivotally mounted to the main frame, the free end adjacent to ground, wherein are journaled shafts having shear blades secured; adjustable connecting links connecting auxiliary frames to sidewise positioned housings, means for operating all rotary parts.

2. In a machine of the character specified, the combination with the main frame, a housing secured thereon, transmission secured in housing, axles secured in transmission and journaled in housing, wheels with teeth on the face thereof secured to the axles, supplemental frames pivotally mounted to the housing and hub of wheels with one end oscillatable, a wheel loosely journaled on shaft secured crosswise in the oscillated end of the supplemental frames; endless lug plate foliage grip link belt over the wheels and the wheels which are secured to the axles, the free ends of the frames being oscillated in a vertical plane with lever and link connections, whereby the frames may be raised for turning or lowered as desired for foliage grip and traction; a circular plate secured to front of main frame a second plate having a U shaped frame secured and journaled in the first mentioned plate; a wheel loosely journaled on a shaft secured in lower end of the U shaped frame; adjustable stub shafts secured on each side, whereon is journaled a rolling colter blade for penetrating the soil and severing foliage; a main shaft having gears and a clutch secured thereon journaled longitudinally of main frame; retaining frames pivotally mounted at their front end to main frame, a sidewise positioned housing pivotally hung in each frame, wherein is journaled a shaft with a disk shaped cutting edge secured to the lower end; means for operating same from the main shaft in rotational movement at a greater rate of speed than the machine travels, angular shaped auxiliary frames pivoted to downward extending adjustable arms, the arms being secured at upper end to main frame; a series of circular shear blades mounted in rear or free end of each auxiliary frame; pivotally connected adjustable links pivoted at the rear of the center of each auxiliary frame and secured to a sidewise positioned housing, said adjustable links being the device for automatically adjusting the housing wherein is journaled the shaft having a disk cutter secured thereon; pivotally retained means for operating same at a greater rate of speed than the machine travels, supplemental digger frames pivoted at their forward ends to the main frame; digger arms with circuitous shaped digger blades secured to supplemental digger frames, the outer blades being of greater length and height than the inner, pivotally hung auxiliary frames oscillated between and rear of digger arms; a plurality of operated endless cleaner chains, the outer chains being of greater length than the inner chains and traveling at a greater rate of speed; means for operating the cleaner chains at a greater rate of speed than the machine travels; levers for operating the raising and lowering of the supplemental and auxiliary frames.

3. In a machine of the character specified, the combination with the main frame, retained cutting disks, the outer edges held at a lower elevation than the inner edges by means of sidewise positioned housings pivotally hung and retained in retaining frames pivotally mounted to main frame; auxiliary frames pivoted to arms secured to main frame; shafts journaled in free ends of auxiliary frames; spaced shear blades secured on said shafts, said shear blades moving the auxiliary frame in a vertical plane as they contact the different heights of beets; adjustable connecting links connecting the housings to the auxiliary frame, moving the housing in a vertical plane but at a slower rate of speed; supplemental digger frames having downward extending arms secured, pivoted to main frame; arms with digger blades secured, which are circuitous in shape, the outer ones being of greater length and height than the inner; auxiliary frames pivotally hung between digger arms and carrying movable endless cleaner chains, the outer ones of greater length than the inner and traveling at a greater rate of speed, means for operating same.

4. In a machine of the character specified, the combination with the main frame, a housing secured thereon, transmission secured in the housing, axles journaled in the housing and secured in the transmission; wheels with grip retaining members secured on axles; adjustable oscillated supplemental frames in connection with said wheels; a shaft in the forward end of each of the supplemental frames; a wheel on each shaft; oscillated endless link belt lugplate grip tracks over said wheels and engaging the ground; means for raising and lowering adjustable end of said frame and track, the raising and lowering of one end at will, a plate movement at forward end of the main frame; a U shaped frame secured to the plate; a wheel journaled in the lower end; adjustable rolling colter blade on each side so spaced as to sever beet leaves in a line with inner digger blades, a main shaft driven by the axles carrying gear and clutch to drive shafts having gears secured thereon journaled in bearings transversely on the main frame at its forward end; retaining frames pivoted on said bearings and extending rearward; vertically sidewise positioned housing pivoted in each retaining frame near its rear end; a shaft journaled in each housing; a cutting disk secured to the lower end of each shaft, the means for operating said disks; adjustable arms extending downward and secured to the forward end of the main frame; adjustable angular shaped frames pivoted to the lower ends of said arms and extending rearward, a plurality of shafts journaled transversely in the free end of each frame; a plurality of circular shear blades secured on each shaft positioned and so spaced so as to have a shearing or cleaning effect on each other and means for operating same; a plurality of supplemental digger frames pivoted at their forward ends to forward end of the main frame, and extending rearward, digger arms extending downward and fastened to the rear ends of the supplemental frames, circular shaped digger blades secured on lower ends of said digger arms one being of greater length than the other, a plurality of shafts having a gear and a plurality of sprocket wheels secured thereon, one sprocket on each being larger in diameter than the other, journaled crosswise of main frame near rear end, oscillated auxiliary frames pivotally journaled on said shafts and extending rearward; the outer sides being of greater length than the inner, a plurality of downward extending arms pivoted in the front ends of auxiliary frames; sprockets journaled between the arms and in alinement with sprockets and rollers, and means for operating same.

5. In a machine of the character specified, the combination with the main frame mounted endless foliage grip traction tracks, steered rolling colters and wheel mounted to circular plate for movement; cutting disks, the outer edge retained at a lower elevation than the inner edges in conjunction with sidewise positioned housings pivotally hung in pivotally mounted retaining frames, the main frame having downward extending arms thereto secured, each pair of arms having secured to them a plurality of circular lifting blades the outer blades being of greater length and height than the inner; cleaner chains the outer ones being of greater length than the inner ones, which move at a greater rate of speed, and carried on pivotally mounted auxiliary frames, which oscillate directly over the lifting blades, the free ends of which contact the beets as they are raised from the ground, means for operating same; means for raising out of operative and lowering into operative positions the supplemental and auxiliary frames.

6. In a machine of the character specified, the combination with the main frame, a housing secured transversely to the main frame; transmission secured in the housing, axles secured in the transmission and journaled in said housing; wheels secured on the axles; oscillated supplemental frames pivoted to housing and hub of wheels; a wheel in the forward end of each of the supplemental frames; foliage holding link belts operating on said wheels; connecting means for oscillating the forward end of the supplemental frames, a circular plate secured to the front of the main frame; a second plate journaled in the first named plate having a downward extending frame secured thereon; a wheel journaled in the frame's lower end; adjustable stub shafts secured on each side of said frame; a rolling colter journaled on each stub shaft; means for operating said plates for movement; a plurality of supplemental digger frames pivoted to forward end of main frame and extending rearward, the arms of which extend downward, circuitous digger blades secured to lower ends of digger arms, the one on each outer side being of greater length and height than the inner causing the inward delivery of both supplemental digger frames; a plurality of endless link belts, positioned between digger arms and directly over lifting blades; means for operating the same; a plurality of retaining frames pivoted on bearings secured to the forward end of the main frame and extending rearward; a housing pivoted near the rear end of each retaining frame and positioned at an inward angle; cutting disks retained thereby so that the outer edges are held at a lower elevation than the inner, adjustable arms extending downward and secured to the forward end of the main frame; adjustable angular shaped auxiliary frames pivoted to the lower ends of the downward extending arms, said frames extending rearward and having in their rear ends a plurality of shafts journaled crosswise, one being on a higher elevation in each frame than the other; a plurality of circular blades secured on each shaft, so spaced and positioned that the side of the blades on one shaft contacts the side of the blades on the other, thus automatically cleaning each other, means for operating such sets or shafts in the same rotational direction and at a greater rate of speed than the machine travels, adjustable connecting means between shear blade auxiliary frames and sidewise positioned housings, whereby the vertical movement of the frames will impart a vertical movement of less speed to the housings; means for operating same.

7. In a machine of the character specified the combination with the main frame wheels supported and pivotally connected oscillated supplemental frames having mounted endless track for foliage grip and traction, mounted to front end of main frame in combination right and left, left and right side delivery harvester units comprising rotary cutting edges in automatic movement with rotary shear blades mounted in auxiliary frames; means for adjusting auxiliary frames relative to the sidewise positioned housings, means for operating same, pivotally mounted supplemental digger frames having circuitous digger blades attached some of greater length and height than others; auxiliary frames supporting a plurality of rotary endless cleaner chains, some of greater length than the others and traveling at a greater rate of speed; beet topping mechanism in combination with beet digging mechanism, means for operating the rotary elements and means for raising and lowering same in and out of operative positions.

8. In a machine of the character specified, the combination with the main frame wheels supported and pivotally connected oscillated supplemental frames having mounted endless track for foliage grip and traction, bearings secured transversely of the main frame at the forward end; retaining frames pivoted on said bearings and extending rearward; vertically sidewise positioned housings pivoted in each retaining frame; a shaft journaled in each housing, a rotary cutting disk secured thereon, means for operating same, adjustable arms extending downward and secured to the forward end of main frame; adjustable angular shaped auxiliary frames pivoted to the lower ends of said arms and extending rearward, a plurality of shafts journaled transversely in the free end of each auxiliary frame, a plurality of circular shear blades secured on each shaft and positioned and spaced so as to have a shearing and cleansing effect on each other, means for operating the same; supplemental digger frames pivoted at their forward ends, to the main frame and extending rearward; digger arms extending downward and fastened to the rear end of the supplemental frames, circuitous shaped digger blades secured on lower ends of said digger arms, the outer ones being of greater length and height than the inner ones; shafts journaled crosswise to the main frame near rear end; oscillated auxiliary frames pivotally journaled on main frame and extending rearward; said auxiliary frames supporting endless link belts, the outer ones traveling at a greater rate of speed than the inner, means for operating same, means for raising and lowering of the several frames.

9. In a machine of the character specified, the combination with the main frame wheels supported and pivotally connected oscillated supplemental frames having mounted endless track for foliage grip and traction, sidewise tilted cutting disks mounted in sidewise positioned housings pivotally hung in pivotally mounted retaining frames; pivotally mounted shear blades in angular shaped auxiliary frames, means for operating same, pivotally mounted supplemental digger frames; digger arms extending downward secured at rear, circuitous digger blades secured thereon the outer ones being of greater length and height than the inner ones, auxiliary frames pivotally hung to main frame, whereon is mounted a series of endless cleaner chains the outer chains, being of greater length than the inner, and traveling at a greater rate of speed, means for operating same; means for raising and lowering the several frames in and out of the operative position and clutch means to control all said operating means.

10. In a machine of the character specified, the combination with the main frame wheels supported and pivotally connected oscillating supplemental frames, with mounted endless track for foliage grip and traction; pivotally mounted retaining frames to which are pivotally hung sidewise positioned housings carrying rotary cutting disks, downward extending arms secured to main frame, angular shaped auxiliary frames pivotally hung to lower ends of the arms, spaced circular shear blades in each auxiliary frame and adjacent to the ground; pivotally mounted means for operating same; adjustable connecting links pivoted rear of center of angular shaped auxiliary frames, the opposite ends being secured to sidewise positioned housings so that the shear blades contact the crown of the beets, the housing is automatically adjusted and carried in a vertical plane; means for operating the same; supplemental digger frames, circuitous digger blades attached, one on each frame being of greater length and height than the other, vertically oscillated auxiliary frames whereon are mounted endless cleaner chains, the movement of which keps the beets with tap root between the spaced digger blades and moves the dirt from the sides of the beets; means for operating same; means for moving the several frames in and out of operative position.

11. In a machine of the character specified, the combination with the main frame wheels supported and pivotally connected oscillated supplemental frames, having mounted endless track for foliage grip and traction, an auxiliary frame pivoted to the main frame and carrying a driven circular shear blade, retaining frames pivotally hung to main frame extending rearward; a vertically sidewise positioned housing pivoted to each retaining frame, a shaft journaled in said housings, a cutting disk secured to the lower end of each shaft, the cutting edges of the disks elevated in a vertical plane and at a less rate of speed than are the circular shear blade auxiliary frames by means of connecting links, pivotally mounted supplemental digger frames with circuitous shaped digger blades of different lengths; mounted endless cleaner chains operating directly over the digger blade and corresponding thereto in length; the outer chains traveling at a greater rate of speed than the inner.

12. In a machine of the character specified, the combination with the main frame wheels supported and pivotally connected supplemental frames, having mounted endless track for foliage grip and traction; supplemental digger frames pivoted near forward end of main frame; digger arms secured to rear end of the digger frames and extending downward; circuitous beet digger blades secured on lower end of the arms the outer blades on each pair of arms being of greater length and height than the inner blades, mounted cleaner chains of corresponding length; a shaft having gears secured thereon journaled longitudinally of main frame, shafts having gears secured thereon journaled in bearings secured transversely to the main frame, retaining frames pivoted on said bearings and extending rearward, sidewise positioned housings pivoted in rear of retaining frames, shafts having cutting disks secured to lower ends; downward extending arms secured to forward end of main frame; angular shaped auxiliary frames pivoted at lower end, shafts having circular shear blades secured thereon journaled transversely to said frames and so positioned that the shear blades on the one shaft shear the side of the blades on the other shaft; the forward set of shear blades being positioned at a greater height than the rear set; with respect to the ground, adjustable links pivoted rear of center of shear blade auxiliary frames; the other ends being secured to sidewise positioned housing thus as the auxiliary frames are raised or lowered the cutting edges are automatically adjusted; means for operating said shear blades in the same rotational direction.

13. In a machine of the character specified, the combination with the main frame wheels supported and pivotally connected oscillated supplemental frames having mounted endless track for foliage grip and traction; retaining frames pivoted to main frame; sidewise positioned housings, pivotally retained therein and near rear end of adjustable downward extending arms secured to main frame pivotally connected auxiliary frames, the free end of each adjacent to the ground, spaced carrying shear blades for contacting the crown of the beets, means for operating same; adjustable link connections between auxiliary frames and sidewise positioned housings, pivotally mounted supplemental digger frames, pivotally hung frames, supporting endless cleaner chains, the outer positioned chains traveling at a greater rate of speed than the inner and being of greater length, means for operating said chains; a frame pivotally mounted to the rear end of the supplemental digger frames and associated in link and lever connection with main frame for raising and lowering all pivotal frames in one operation.

14. In a machine of the character specified, the combination with the main frame wheels supported and pivotally connected oscillated supplemental frames having mounted endless track for foliage grip and traction, auxiliary harvester units pivotally hung on main frame in associated combination, right and left, left and right, cutting edges in automatic combination with circular shear blades for contacting beets, means for adjusting auxiliary frames relative to the cutting edges, said means pivoted rear of center of auxiliary frames and secured to and near end of sidewise positioned housings, an opening and closing of the rear ends of the angular shaped auxiliary frames and the sidewise positioned housings; means for effecting the opening and closing, pivotally mounted supplemental digger frames; circuitous digger blades some of greater length and height than the others; auxiliary frames, and endless cleaner chains, the outer one on each frame being of greater length than the inner ones and traveling at a greater rate of speed; beet topping mechanism in combination with beet digger mechanism, means for raising and lowering same in and out of operative position.

15. In a machine of the character specified, the combination with the main frame wheels supported and pivotally connected oscillated supplemental frames having mounted endless track for foliage grip; oscillated right and left side delivery units operating conjointly as one harvester, the outer delivery of tops and the inner delivery of beets, a right side delivery topping disk oscillated in a vertical plane automatically, with circular shear blades in a pivotally mounted angular shaped auxiliary frame, associated conjointly with left side inward delivery digger blades, the outer blade being of greater length and height than the inner, and a plurality of pivotally mounted oscillating endless cleaner chains, the outer ones being of greater length than the inner and traveling at a greater rate of speed; a left side delivery topping disk oscillated in a vertical plane automatically, with circular shear blades in a pivotally mounted angular shaped auxiliary frame associated conjointly with right side inward delivery lifting blades, the outer blade being of greater length and height than the inner; and a plurality of pivotally mounted vertical oscillating endless cleaner chains one being of greater length than the other and traveling at a greater rate of speed; the units operating in unison conjointly right and left, left and right; right with the tops and left with the beets; left with the tops and right with the beets for windrowing both the tops and the beets; means for operating same; means for raising or lowering all operative units in and out of operative position.

16. In a machine of the character specified, the combination with the main frame wheels supported and pivotally connected oscillated supplemental frames having mounted endless track for foliage grip and traction, retaining frames, which are pivoted to main frame, sidewise positioned housings, pivoted to the retaining frames, angular shaped auxiliary frames connected pivotally and adjustably to downward extending arms secured adjustably to the main frame, the free end of the auxiliary frames adjacent to the ground, spaced circular shaped shear blades for contacting the crown of the beets, means for operating same in the same rotational movement; adjustable link connections between angular shaped auxiliary frames and sidewise positioned housings, so connected and positioned as to cause the housing to move at a slower rate of speed, than the circular shaped blades; circuitous shaped digger blades secured to the digger arms of the pivotally mounted supplemental digger frames; pivotally mounted auxiliary frames supporting mounted endless cleaner chains the outer positioned chains traveling at a greater rate of speed than the inner and being of greater length; a frame pivotally mounted to rear end of supplemental digger frames and in link and lever association with main frame for raising and lowering all pivotal frames in one operation.

17. In a machine of the character specified, the combination with the main frame wheels supported and pivotally connected oscillated supplemental frames having mounted endless track for foliage grip and traction, digger units pivoted to frame, pairs of circuitous digger blades of each unit secured at its extreme lowest point, one of each pair of circuitous digger blades being of greater length; inward delivery means comprising endless link belt cleaner units operating between inward digger units; means for operating same; cutting disk retaining frames pivoted to forward end of main frame; a housing pivoted in each retaining frame; said housings positioned at an inward angle thus retaining the outer edges of the cutting disks at a lower elevation than the inner for the delivery of both topping units to the outward extremity of the harvester, arms secured to forward end of the main frame and having adjustable angular shaped auxiliary frames pivoted to the lower ends thereof, said frames extending rearward having at their rear ends a plurality of shafts journaled crosswise and thereon fastened circular shear blades so positioned and spaced that the one side of the blades on the one shaft comes against the side of the blades on the other and are rotated in the same direction, means for operating same.

18. In a machine of the character specified, the combination with the main frame wheels supported and pivotally connected oscillated supplemental frames having mounted endless track for foliage grip and traction; pivotally mounted oscillated retaining frames; auxiliary supplemental mechanism operating conjointly for the harvesting of beets; the right side delivery topping disks rotated at the end of sidewise positioned housing pivoted near rear of the retaining frame; oscillating in a vertical plane by the movement of circular shear blades in the pivotally mounted auxiliary frame, and operated on the same row conjointly with left side delivery supplemental digger frames, and auxiliary frames; endless cleaner chains; right side delivery of tops and left side delivery of beets; right side delivery topping disk rotated at the end of the sidewise positioned housing; pivoted near rear of retaining frames oscillating in a vertical plane by the movement of circular shear blades in the pivotally mounted auxiliary frames, and operated on the same row conjointly with right side delivery supplemental digger frames and auxiliary frame; endless cleaner chains, the left side delivery of tops and the right side delivery of beets, means for operating same.

19. In a machine of the character specified, the combination with the main frame wheels supported and pivotally connected oscillated supplemental frames, having mounted endless track for foliage grip and traction; a sidewise retained right side delivery topping disk, oscillated automatically with angular shaped shear blade unit and operated conjointly with left side inward delivery digger blades, one being of greater length and height than the other; a plurality of vertical oscillated endless cleaner chains, one being of greater length than the other and traveling at a greater rate of speed; a side wise retained left side delivery topping disk oscillated automatically in a vertical plane with angular shaped auxiliary frame by shear blades and operated conjointly with right side delivery beet digger blades, a plurality of vertical oscillated endless cleaner chains, one being of greater length than the other and traveling at a greater rate of speed; the unison of the units operating together right and left, left and right, right with the tops, left with the beets, and left with the tops and right with the beets, thus windrowing both the tops and beets, means for operating same.

JOHN DEVEY, Jr.